United States Patent
Allegue Martinez et al.

(10) Patent No.: US 10,542,398 B2
(45) Date of Patent: Jan. 21, 2020

(54) SYSTEM, METHOD AND APPARATUS FOR SENSING CHANGES IN AN ENVIRONMENT USING WIRELESS COMMUNICATION SIGNALS

(71) Applicant: Aerial Technologies Inc., Montreal (CA)

(72) Inventors: Michel Allegue Martinez, Montreal (CA); Matthew Kirby Smith, Montreal (CA)

(73) Assignee: Aerial Technologies Inc., Montreal (CA)

( * ) Notice: Subject to any disclaimer, the term of this patent is extended or adjusted under 35 U.S.C. 154(b) by 0 days.

(21) Appl. No.: 16/002,944

(22) Filed: Jun. 7, 2018

(65) Prior Publication Data

US 2018/0288587 A1 Oct. 4, 2018

Related U.S. Application Data

(63) Continuation of application No. PCT/CA2016/051533, filed on Dec. 22, 2016.
(Continued)

(51) Int. Cl.
| | |
|---|---|
| *H04W 4/38* | (2018.01) |
| *H04W 4/60* | (2018.01) |
| *H04W 4/02* | (2018.01) |
| *H04W 24/08* | (2009.01) |
| *H04W 84/18* | (2009.01) |
| *H04W 4/029* | (2018.01) |
| *G06N 20/00* | (2019.01) |
| *H04W 84/12* | (2009.01) |

(52) U.S. Cl.
CPC ............. *H04W 4/38* (2018.02); *H04W 4/029* (2018.02); *H04W 4/60* (2018.02); *H04W 24/08* (2013.01); *G06N 20/00* (2019.01); *H04W 84/12* (2013.01)

(58) Field of Classification Search
CPC ......... H04W 4/38; H04W 4/60; H04W 4/029; H04W 4/021; H04W 24/08; H04W 84/18
See application file for complete search history.

(56) References Cited

U.S. PATENT DOCUMENTS

| 4,191,953 A | 3/1980 | Woode |
|---|---|---|
| 7,359,836 B2 | 4/2008 | Wren et al. |

(Continued)

FOREIGN PATENT DOCUMENTS

| CA | PCT/CA2016/051533 | 12/2016 |
|---|---|---|
| WO | 2006/125950 A1 | 11/2006 |
| WO | 2012006549 A2 | 1/2012 |

OTHER PUBLICATIONS

Badoi, C.; Supplementary European Search Report from corresponding European Application No. 16877054.3; search completed Jun. 20, 2019.
(Continued)

*Primary Examiner* — Ronald B Abelson
(74) *Attorney, Agent, or Firm* — Brett J. Slaney; Blake, Cassels & Graydon LLP

(57) ABSTRACT

A wireless signal-based sensing system is provided. The system includes a plurality of devices, each device capable of sending and receiving wireless signals to create a sensing area. The system also includes at least one connection mechanism to enable at least one of the devices to connect to an application, and at least one analytics application for processing measurements of wireless signals obtained from the sensing area.

35 Claims, 8 Drawing Sheets

Related U.S. Application Data

(60) Provisional application No. 62/387,174, filed on Dec. 23, 2015.

(56) References Cited

U.S. PATENT DOCUMENTS

| | | |
|---|---|---|
| 7,843,323 B2 | 11/2010 | Lim et al. |
| 8,079,277 B2 | 12/2011 | Bang et al. |
| 8,164,522 B2 | 4/2012 | Jiang et al. |
| 8,710,984 B2 | 4/2014 | Wilson et al. |
| 8,774,829 B2 | 7/2014 | Farley et al. |
| 2003/0043841 A1 | 3/2003 | Jones .................. H04L 12/24 |
| 2006/0017566 A1 | 1/2006 | Gauvreau et al. |
| 2008/0143529 A1 | 6/2008 | Gauvreau |
| 2010/0141397 A1 | 6/2010 | Kim et al. |
| 2013/0196684 A1 | 8/2013 | Dong et al. |

OTHER PUBLICATIONS

Xiao, Jiang et al.; "FIMD: Fine-grained Device-free Motion Detection"; Parallel and Distributed Systems (ICPADS), 2012 IEEE 18th International Conference on, IEEE, Dec. 17, 2012 (Dec. 17, 2012); pp. 229-235; DOI: 10.1109/ICPADS.2012.40; ISBN: 978-1-4673-4565-1.

Liu, Wenyuan et al.; "Bfp: Behavior-Free Passive Motion Detection Using PHY Information"; Wireless Personal Communications, Springer, Dordrecht, NL; vol. 83, No. 2; Feb. 21, 2015 (Feb. 21, 2015); pp. 1035-1055; ISSN: 0929-6212, DOI; 10.1007/S11277-015-2438-7 [retrieved on Feb. 21, 2015].

Timalsina, Sunil K. et al.; "Comparison of Cooperative Spectrum Sensing and Sharing Techniques in Cognitive Radio Networks"; Networked Computing (INC), 2011 the 7th International Conference on, IEEE, Sep. 26, 2011 (Sep. 26, 2011); pp. 36-41; ISBN: 978-1-4577-1129-9.

Bayaa, H.; International Search Report from corresponding PCT Application No. PCT/CA2016/051533; search completed Apr. 5, 2017.

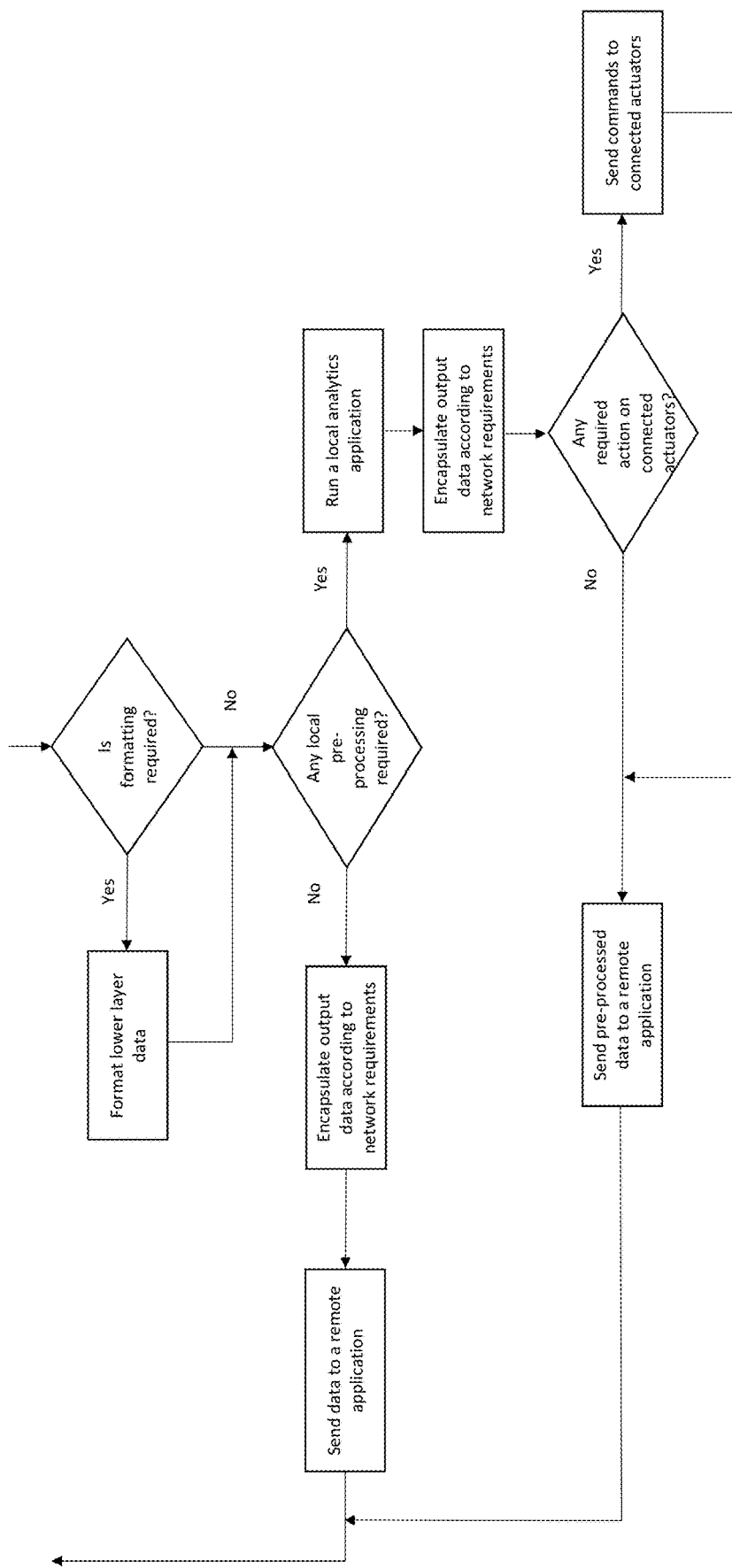
FIG. 4(a) – con..

SYSTEM, METHOD AND APPARATUS FOR SENSING CHANGES IN AN ENVIRONMENT USING WIRELESS COMMUNICATION SIGNALS

CROSS REFERENCE TO RELATED APPLICATION(S)

This application is a continuation of PCT Application No. PCT/CA2016/051533 filed on Dec. 22, 2016, which claims priority to U.S. Provisional Patent Application No. 62/387,174 filed on Dec. 23, 2016, both incorporated herein by reference.

TECHNICAL FIELD

The present disclosure relates to object detection, localization, tracking and activity recognition within an area of interest for sensing changes in an environment using wireless communication signals.

DESCRIPTION OF THE RELATED ART

Many forms of object detection, motion detection and activity recognition exist today, including optical and thermal/infrared cameras, passive/active infrared motion detectors, acoustic sensors, vibration sensors, cameras, induction coils, and radio frequency (RF) sensors. These technologies can be useful in applications such as security, home automation, elderly and child monitoring, and others.

One of several challenges of existing object detection, motion detection and activity recognition technologies is the requirement to deploy additional network infrastructure in order to support sensor communication.

Recent research and advancements have developed sensing techniques that utilize measurements available through state monitoring of existing wireless systems and devices currently used only for communication purposes.

SUMMARY

The following relates to the creation of a sensing area for activity recognition by re-using particular information, e.g., information available in the lower layers of the OSI reference model of existing wireless communication systems. Systems, methods and apparatus are provided in order to create a wireless signal-based sensing platform that employs local and/or remote processing capabilities for object detection, localization, tracking and activity recognition.

The following also proposes a system, method, and apparatus that can collect fine-grained measurements available in existing wireless systems and devices that can be used for activity recognition without necessitating the addition of new network infrastructure as currently required. An example of these fine-grained measurements is the channel state information (CSI) measurements in systems such Wi-Fi and regulated by the IEEE 802.11n and IEEE 802.11ac standards, which provide continuous fine-grained measurements characterizing the behavior of the wireless channel between a transmitter and a receiver.

In one aspect, there is provided a wireless signal-based sensing system comprising: at least one sensing area generated by a plurality of devices, each device in the sensing area capable of sending and receiving wireless signals according to a communication protocol, wherein the communication protocol comprises at least one existing mechanism at a first layer of the devices for sensing a communication channel between pairs of connected devices in the sensing area; at least one application of at least one of the plurality of devices to access at least the first layer of the device to obtain measurements sensed by the communication protocol using the existing mechanism, wherein the at least one application is configured to generate traffic on the communication channel when an insufficient amount of network traffic is present; and at least one analytics application for receiving and processing measurements of wireless signals obtained from the sensing area by the plurality of devices.

In another aspect, there is provided a method for wireless signal-based sensing comprising having a sensing area generated by a plurality of devices, each device in the sensing area capable of sending and receiving wireless signals according to a communication protocol, wherein the communication protocol comprises at least one existing mechanism at a first layer of the devices for sensing a communication channel between pairs of connected devices in the sensing area; establishing the communication channel to generate sensed data at the first layer; enabling at least one application of at least one of the plurality of devices to access at least the first layer of the device to obtain measurements sensed by the communication protocol using the existing mechanism, wherein the at least one application is configured to generate traffic on the communication channel when an insufficient amount of network traffic is present; and receiving and processing measurements of wireless signals by at least one analytics application, the measurements having been obtained from the sensing area by the plurality of devices.

BRIEF DESCRIPTION OF THE DRAWINGS

Embodiments will now be described by way of example only with reference to the appended drawings wherein.

DETAILED DESCRIPTION

Figure 1B:
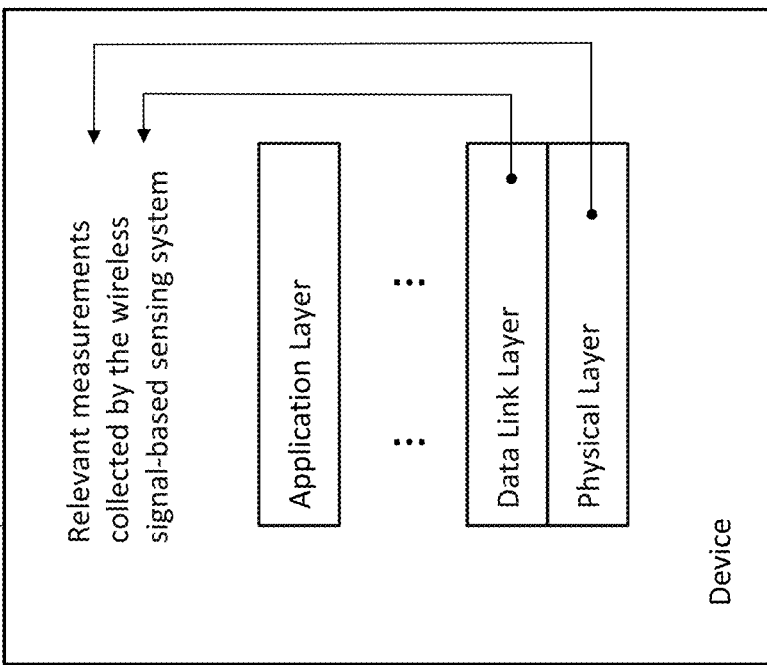
FIG. 1(b) illustrates data extraction functionalities of the device wherein relevant measurements are taken from various layers of the OSI reference model.
Figure 1A:
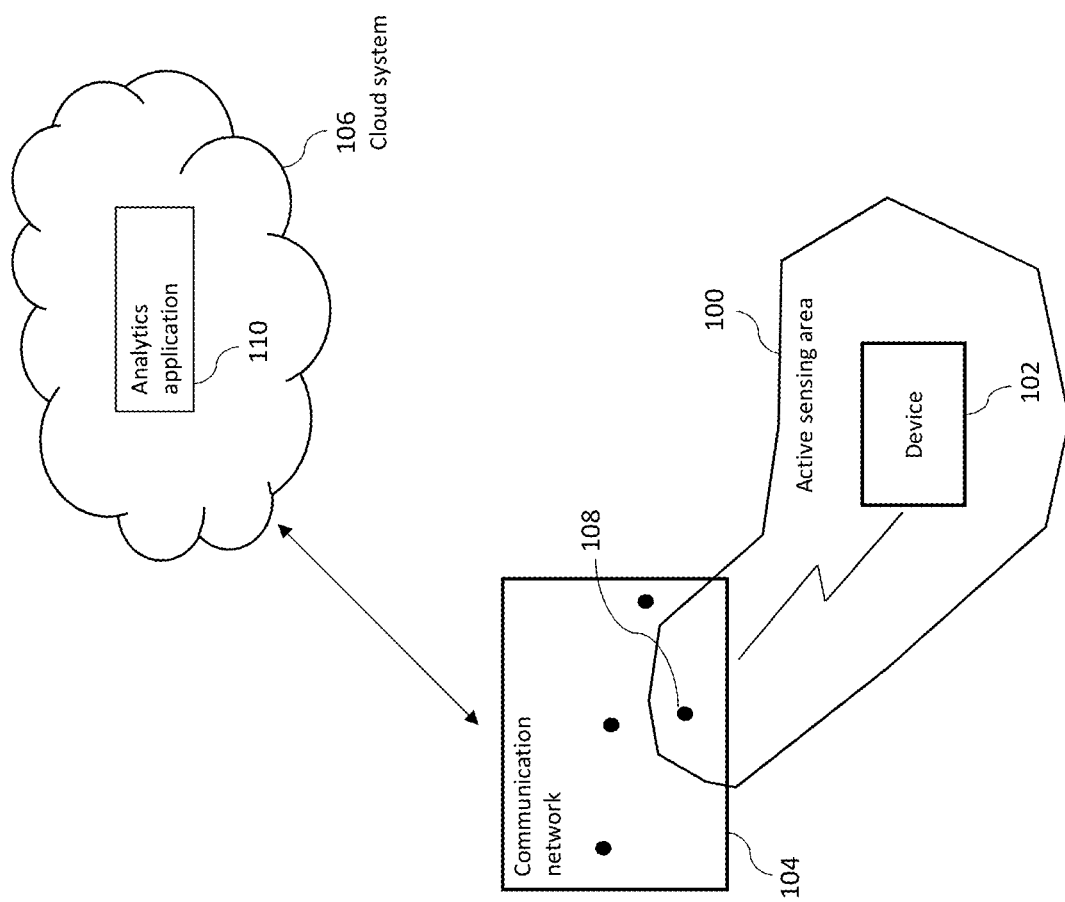
FIG. 1(a) illustrates a system able to sense objects within an area via wireless signals.

As illustrated in FIG. 1(a) an active sensing area 100 is generated via a wireless communication between a device 102 and a communication network 104, which contains at least one node 108 able to transmit and receive wireless signals to and from device 102. Device 102 could be a new device or an existing device modified in order to be capable of extracting measurements required for sensing. The active sensing area 100 includes at least two connected wireless nodes 108 exchanging information about the states of the wireless signals and/or channels. In FIG. 1(a), the device 102 can be considered the second node within the active sensing area 100 that is illustrated.

Most current wireless communication devices implement internal mechanisms for sensing wireless channel states in order to maximize channel capacity and communication robustness. For example, if the open systems interconnection (OSI) reference model is used, then in order to generate relevant measurements for the purposes of activity recognition through the wireless signal-based sensing system proposed herein, the device 102 should connect to at least one other wireless node 108 within the existing communication system with similar physical layer characteristics. The information that is relevant for activity recognition usually remains in the lower layers of the OSI model. These layers are usually the physical layer, data link layer and/or network layer.

One of the functionalities of the device 102 is to collect measurements from the lower layers of the OSI model, as shown in FIG. 1(b), and encapsulate the measurements as data, according to the specifications of the communication system employed for sending the data to an analytics application 110. The analytics application 110 could be hosted within the local network or in a remote network following a cloud-based architecture as shown in FIG. 1(a). The analytics application 110 can interact with external systems or applications which are also "in the cloud" through, for example, an application programming interface (API). The network 104 comprises at least one node 108 provided with the hardware and logic units needed for interconnecting the communication network 104 with at least one remote network where the cloud system 106 hosts the application 110. As was mentioned, the wireless connection between the device 102 and at least one of the nodes within the communication network 104 generates the active sensing area 100. The device 102 becomes one node of the communication network 104. It is worth noting that device 102 could be an additional device added to an existing network 104, or it could be a device already included in network 104 but modified in order to collect the measurements described herein.

One or more of the plurality of devices 102 can include a mechanism to remain fixed in three-dimensional space in order to ensure consistency of measured changes in the environment. Such a mechanism can be used to address the fact that the Wi-Fi devices should remain fixed or the measurements of the attenuation, and phase shifts due to changes in the reflections, obstructions, scattering, among other propagation mechanisms, of the travelling wireless signals (and hence the baseline measurements of the environment) will change. If baseline measurements change, the system would need to re-characterize (i.e., train) for the new device position or compensate according to the new baseline. By fixing the device 102, less training and/or processing is required for it to become useful in the first place, as well as thereafter.

Figure 2:
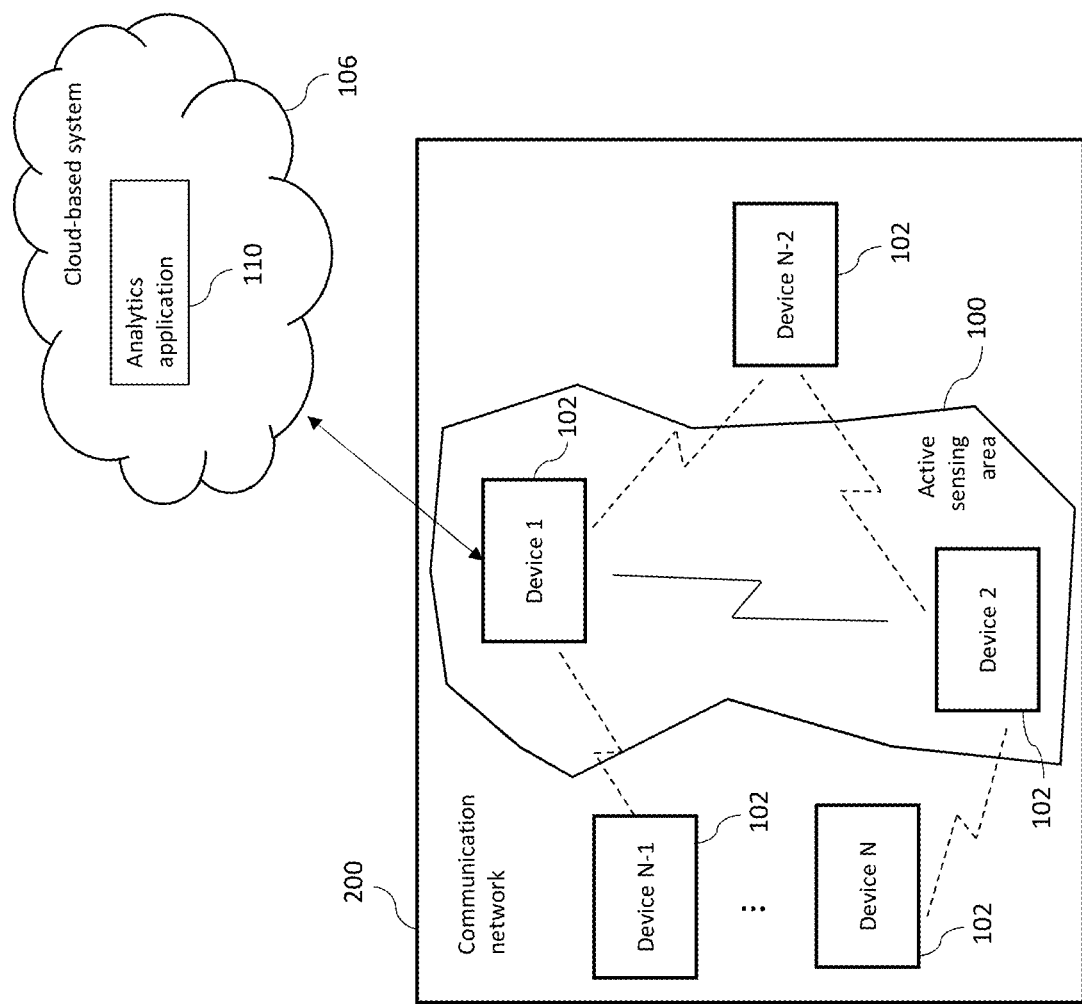
FIG. 2 illustrates a system able to sense objects within an area via wireless signals by connecting at least two instances of the device.

In one of the embodiments described herein a communication network 200 comprises at least two devices 102 as shown in FIG. 2. In this embodiment, devices 102 comprise the entire communication network. By employing two instances of device 102, referred to as Device 1 and Device 2, a sensing area 100 is created as illustrated in FIG. 2. If part or all of the analytics application 110 is hosted in a remote facility, at least one of Device 1 or Device 2 needs to be capable of connecting to the remote network where the application 110 is hosted. If additional devices 102 are incorporated into the sensing system, the active sensing area 100 is enhanced and/or extended according to the number and location of new devices available within the communication network 200 and their wireless communication range. Enhancement of the sensing area occurs as a result of the increase in the number of data sources available. Extension of the sensing area occurs as a result of the increase in overall reach of the wireless network 200. The scope of the systems and methods proposed herein are not limited by any particular network topology. The communication network 200 could be created by following any of the regulated communication standards, e.g. IEEE 802.11 standard family or some new standard.

Figure 3:
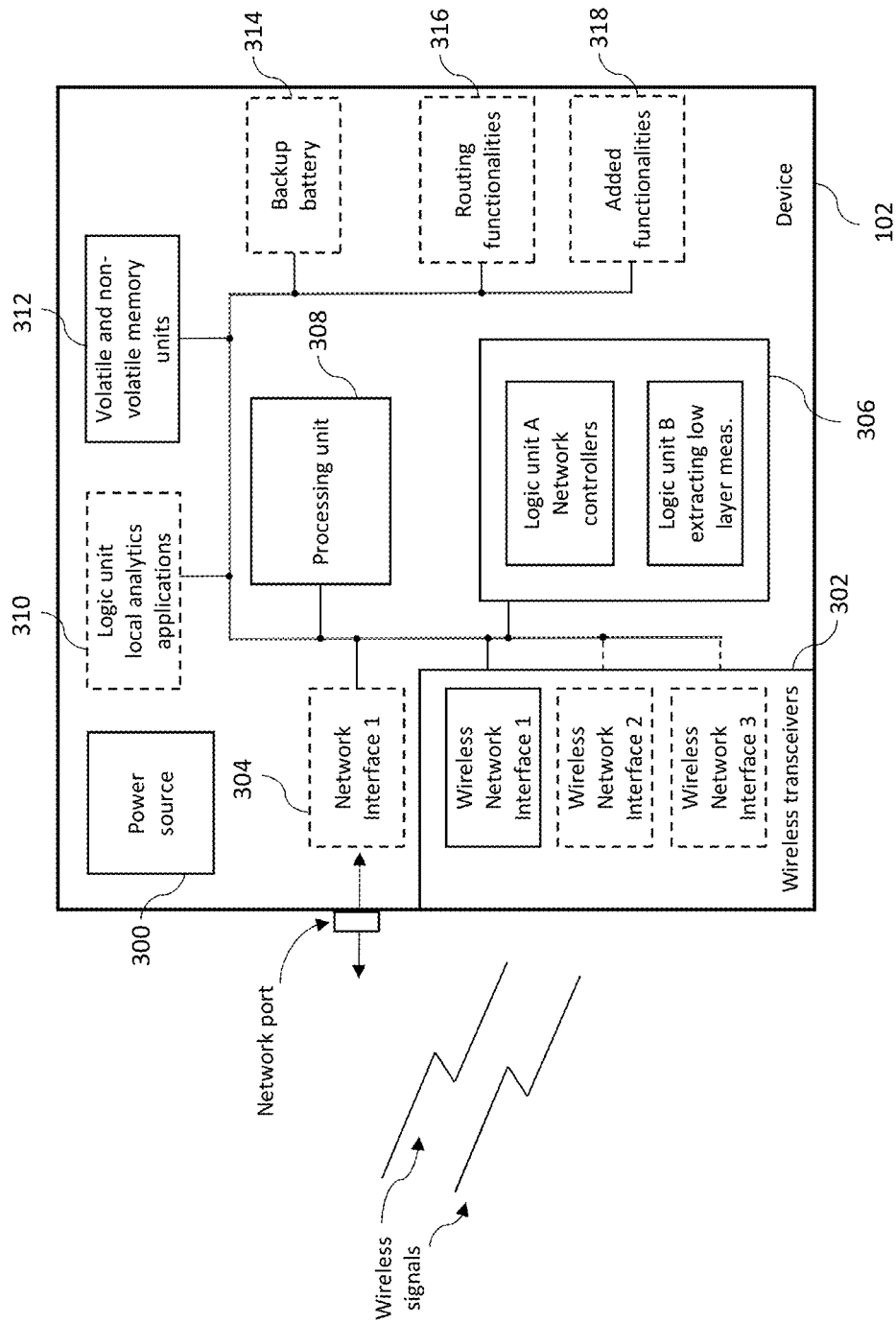
FIG. 3 illustrates a generic physical embodiment of the device.

The basic functional blocks of device 102 are represented in FIG. 3. The device 102 comprises components in order to enable one or more of the functionalities shown in FIG. 3 and/or data flow shown in FIGS. 4(a) and 4(b). A power source 300 is one example of one of these components since it provides the required DC and/or AC voltage while supporting the power consumption of all the different functional blocks implemented in device 102. A wireless transceiver module 302 comprises components needed for sending and receiving wireless signals, e.g. radiation system, amplifiers, filters, mixers, local oscillators, ADC and DAC, and any other component required in the modulator and demodulator. The wireless transceivers module 302 is used to provide at least one wireless link with at least one node 108 within a network 104, or with another device of the same class, i.e. another device 102 as in FIG. 2. The transceiver module 302 can include more than one wireless network interface depending on the functionalities the designer includes in the device. An optional wireless network interface 2 is represented in dashed lines as well as an optional network interface 1 304, with its respective port. An optional network interface 3 could support a wireless link to a remote network, either a network of the same class or a different class to the one generating the sensing area 100, in case the local network is not available due to a power failure or a malfunctioning of a component of the local network. In case of a power failure, the device 102 could be capable of using a backup battery 314 to power a connection to a secondary network of the same or different class in order to forward data to or from a critical application.

In FIG. 3, the logic unit A is a program or multiple programs for managing and controlling the functions associated with the transceivers comprising both wired network interfaces as 304 or wireless network interfaces as within wireless transceivers 302 and with any other functional block within the device that requires a program to implement its functionalities. The logic unit B is the program to interact with the information that usually remains in the lower layers of the OSI reference model while controlling the communication between at least two wireless nodes. The lower layer of the OSI reference model we refer to are at least the physical layer and the data link layer as shown in FIG. 1(b). An example of those measurements is the CSI measurements within IEEE 802.11n and IEEE 802.11ac standards. The processing unit 308 provides processing resources required to execute any of the programs and/or applications designed for a specific implementation of device 102. The logic unit B in 306 could also include information not only about the wireless channel but also about the current performance of the wireless transceivers.

If there is no network and at least two devices 102 are used to create a sensing area 100 as in FIG. 2, at least one instance of device 102 needs to send data to an application regardless of where the application is hosted. This functionality is represented by 316 in FIG. 3, and enables the device 102 to transfer data from one network to another. Additional functionalities can be introduced in the implementation of the device 102 represented by block 318 in FIG. 3. Some examples include, without limitation, input/output interfaces, a speaker, a siren, etc.

Figure 4A:
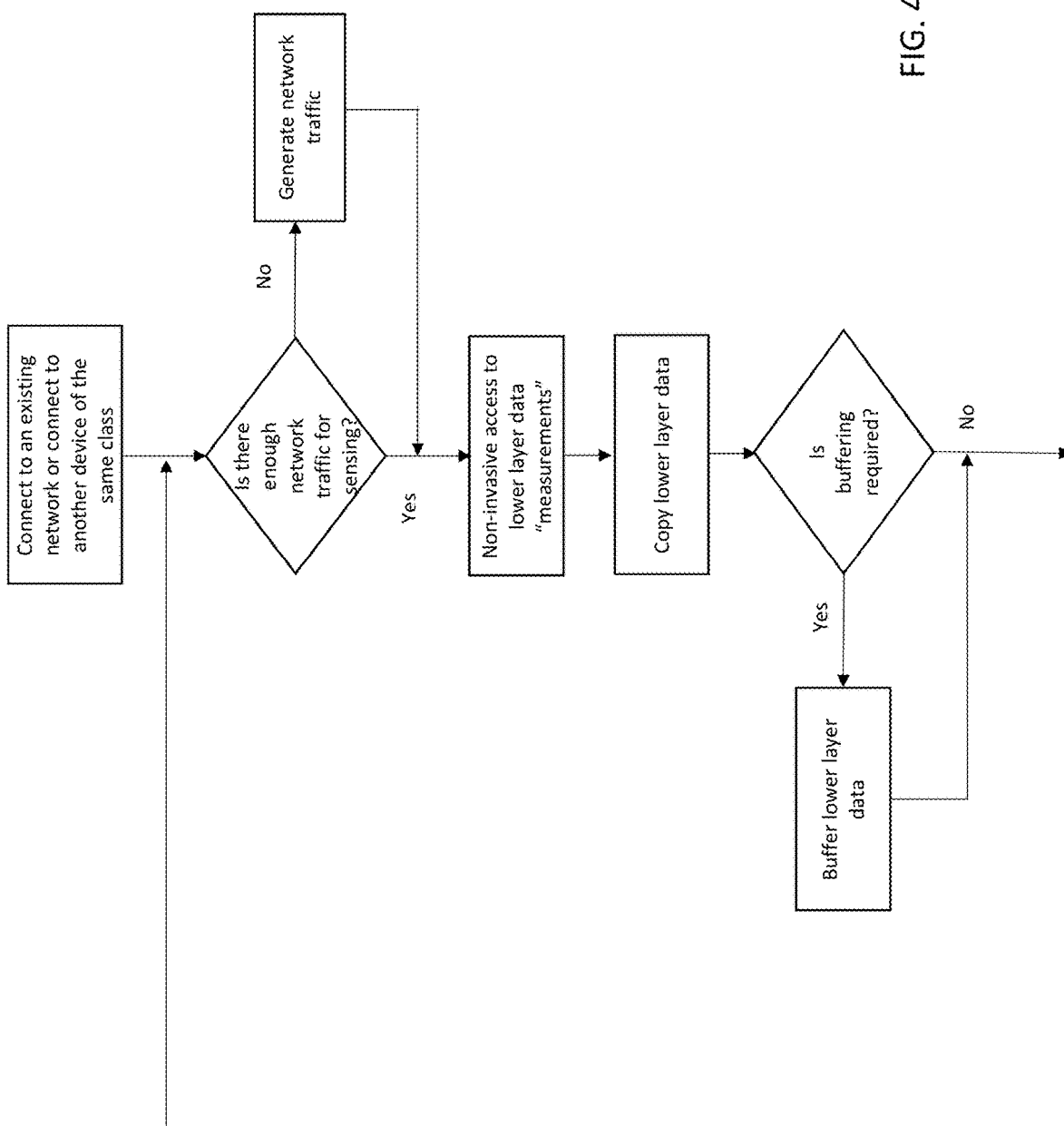
FIG. 4(a) illustrates an example of the functional logic of a device when operating on inputs from the wireless sensing system.

FIG. 4(a) is a flow chart illustrating an example of the functional logic of a device 102 when operating on inputs from the wireless sensing system. The device 102 connects to a network or connects to another device 102 of the same class, as noted above. The device 102 then determines if there is sufficient wireless traffic allowing it to perform appropriate sensing (for instance by ensuring that enough information and/or measurements within the lower layers of the OSI model have been generated for a robust sensing reading). If not, the device 102 generates network traffic in order to allow and/or improve sensing even though there may not be any requirement for the transfer of wireless data over the network and/or devices. If there is sufficient wireless traffic, the device 102 obtains non-invasive access to lower layer data measurements, e.g., channel state information per received package accordingly to IEEE 802.11n, IEEE 802.1ac, and copies this lower layer data. The device 102 then determines if buffering is required and, if so, buffers the lower layer data. Similarly, the device 102 then determines if any formatting is required and, if so, formats the lower layer data.

The device 102 then determines if any local pre-processing is required. If no pre-processing is required, the device 102 can encapsulate output data to the connected network and thus send data to a remote application 110. On the other hand, if preprocessing is required, a local analytics application 310 implements the preprocessing of the measurements, e.g. a local machine learning feature and/or a compression method for compressing the formatted measurements and then sends the results out to the remote application 110. The output from this local analytics application 310 is encapsulated according to the requirements of the connected network. The device 102 also determines if any action is required on connected actuators. If so, commands are sent to those connected actuators in addition to sending the pre-processed data to the remote application 110. The connected actuators can be any external device that moves or controls an external mechanism or system when the control signal is received from the system proposed herein. If the actuators are not directly connected to device 102, the analytics application 110 can interact with an external API developed and implemented to control the actuators, which can be hosted in the cloud. As such, if the actuator is directly connected (e.g., through a WLAN, an Ethernet connection, USB tethering, etc.), the output generated by the analytics application 110 can be shared with the actuator by employing the local connection. In case the actuator interacts through a cloud-based system, the analytics application 110 in the cloud can share its output(s) in the cloud system.

Figure 4B:
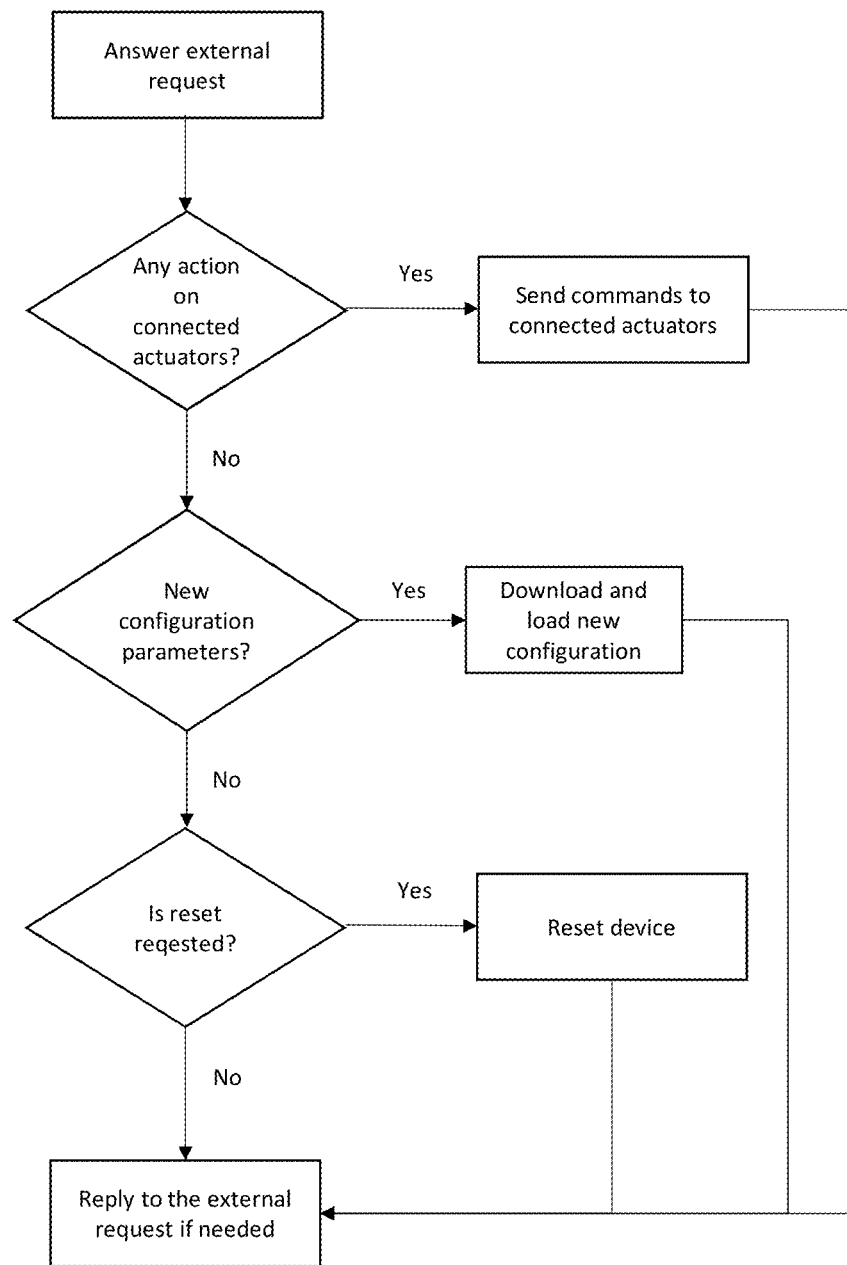
FIG. 4(b) illustrates an example of the functional logic of the device when operating on inputs received from an external device or user.

FIG. 4(b) illustrates the functional logic performed by the device 102 when the control signal is generated in the analytics application 110 in the cloud system 106, or when operating on inputs received from an external device or directly from a user. The device 102 operates to answer an external request by determining if any action is required on connected actuators. If so, commands are sent to the connected actuators accordingly and a reply is sent to the external request. If not, the device 102 then determines if the external request includes new configuration parameters. If so, the new configuration is downloaded and loaded on the device 102 and a reply is sent to the external request. If not, the device 102 determines if the external request requires reset. If so, the device 102 is reset and the device replies to the external request. If the external request is not recognized, a message indicating such is sent as a reply to the external request.

Figure 5:
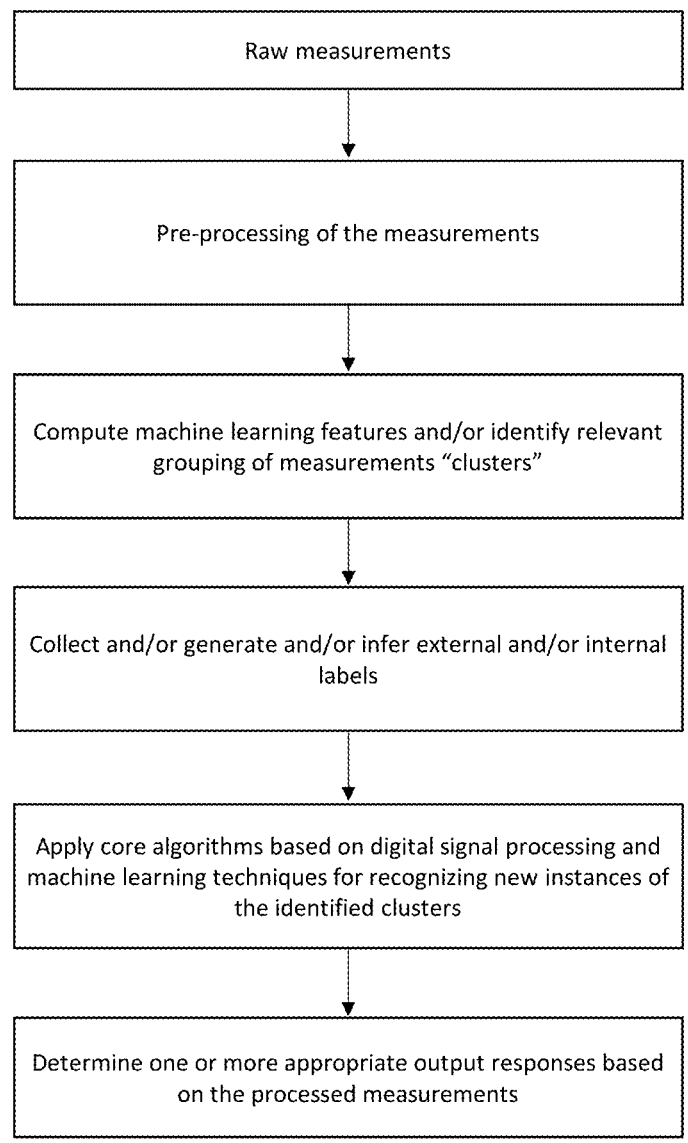
FIG. 5 illustrates an example of the functional logic of an analytics application which could be run, in whole or in part, across multiple devices, including the device in the above figures, and/or one or more remote devices.

FIG. 5 illustrates an example of the functional logic of an analytics application 110 which could be run, in whole or in part, across multiple devices 102. The device 102 obtains raw measurements and pre-processes those raw measurements. The analytics application 110 then computes machine learning features or operations and/or identifies relevant groupings or measurement clusters. The analytics application 110 also collects and/or generates and/or infers external and/or internal labels intended to classify the measurement data and/or features and/or clusters in a meaningful way.

Typically, unlabeled data includes samples of natural or human-created artifacts that one can obtain from the world. Some examples of unlabeled data might include photos, audio recordings, videos, news articles, tweets, x-rays, etc. There is no "explanation" for each piece of unlabeled data—it just contains the data. Labeled data typically takes a set of unlabeled data and augments each piece of that unlabeled data with some sort of meaningful "tag," "label," or "class" that is somehow informative or desirable to know. For example, labels for the above types of unlabeled data might be whether this photo contains an animal or human, which words were uttered in an audio recording, what type of action is being performed in this video, what the topic of this news article is, etc. Labels for data are often obtained by asking humans to make judgments about a given piece of unlabeled data. After obtaining a labeled dataset, machine learning models can be applied to the data so that new unlabeled data can be presented to the model and a likely label can be guessed or predicted for that piece of unlabeled data.

The analytics application 110 then applies one or more core algorithms based on digital signal processing and machine learning techniques for recognizing new instances of the identified clusters. That is, the machine learning techniques can discover and label clusters of data that infer some activity and then monitor new data to recognize similar clusters of data. In this way, the machine learning can infer that the same activity is being performed. The analytics application 110 may then determine one or more appropriate output responses based on the processed measurements. For example, if the sensing system detected a stranger lurking outside a window of a private residence, an appropriate response might be to alert the homeowner and/or local law enforcement with a text message. In summary, the above process can include: Identification of clusters, labels collection (either provided by the users or inferred by specific analytics applications), detection of the previous identified and labelled clusters but now on fresh data coming in, and notification of the activity performed by using the appropriate label(s).

Figure 6:
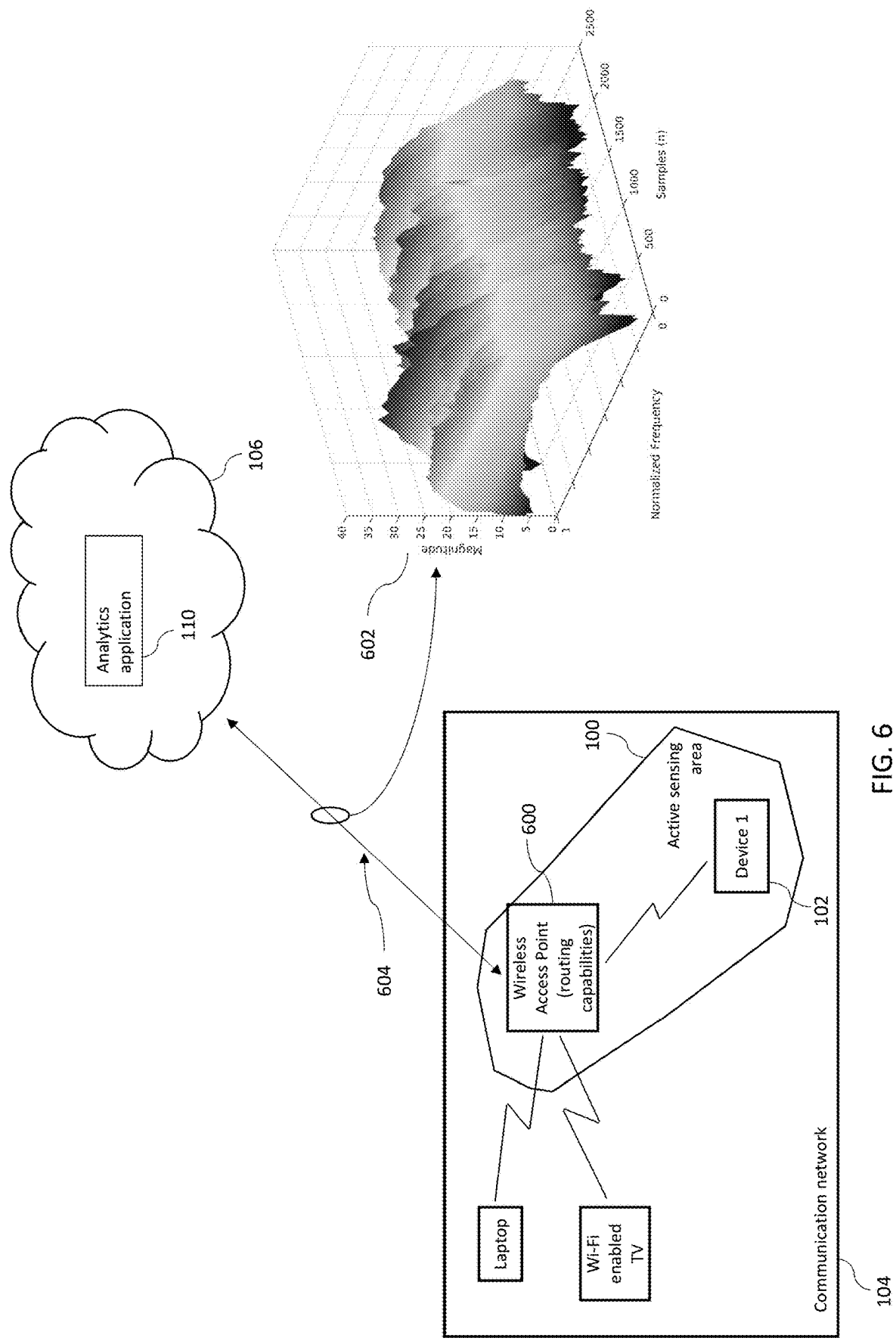
FIG. 6 illustrates an example of the system proposed herein by using a Wi-Fi network in which one of the devices is able to collect channel state information (CSI) and send raw data and/or pre-processed data to a cloud-based application.

FIG. 6 illustrates an example of the system proposed herein by using a Wi-Fi network in which one of the devices is able to collect channel state information (CSI) and send raw data and/or pre-processed data to a cloud-based application. In the example shown in FIG. 6, the raw measurements collected in a device 102 correspond to channel state information measurements of one stream (a link between one of the antennas in the transmitter and one of the antennas in the receiver) for multiple packages that device 102 received from the wireless access point 600, The wireless access point 600 is capable of routing packages to a remote network where the analytics application 110 is hosted. The magnitude of the CSI measurements is used in 602 in order to represent all the frequency components that were measured for each of the acquired samples, e.g. each sample could correspond with the CSI measurement for each of the available subcarriers for each package that was received by device 102. In this example, the actual data encapsulated and sent via the link 604 corresponds to the channel state information available within a certain bandwidth, and for certain subcarriers as established and regulated in IEEE 802.11n and/or IEEE 802.11ac, and for all the streams generating the sensing area 100.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system, any component of or related thereto, or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A wireless signal-based sensing system comprising:
at least one sensing area generated by a plurality of devices, each device in the sensing area capable of sending and receiving wireless signals according to a communication protocol, wherein the communication protocol comprises at least one existing mechanism at a first layer of the devices for sensing a communication channel between pairs of connected devices in the sensing area;
at least one application of at least one of the plurality of devices to access at least the first layer of the device to obtain measurements sensed by the communication protocol using the existing mechanism, wherein the at least one application is configured to generate traffic on the communication channel when an insufficient amount of network traffic is present; and
at least one analytics application for receiving and processing measurements of wireless signals obtained from the sensing area by the plurality of devices, wherein the at least one analytics application is configured to process one or more of: temporal changes in wireless signal intensity, channel frequency response, impulse response, or any other measurable variables of the wireless signals that are sensitive to changes in an environment;
wherein at least one of the plurality of devices is configured to:
read one or more measurable variables;
store one or more measurable variables; and
send one or more measurable variables to at least one of another device and the analytics application.

2. The system of claim 1, wherein the first layer is a layer of the OSI reference model.

3. The system of claim 1, wherein the at least one analytics application is configured to:
create one or more clusters comprising relevant groupings of measurements from the measured data in order to associate those clusters with one or more of: specific subjects, locations, movements or activities; and
store the identified clusters and collects and generates labels for the clusters corresponding to one or more of: subjects, locations, movements or specific activities.

4. The system of claim 3, wherein the at least one analytics application is configured to:
apply at least one of digital signal processing and machine learning, to recognize one or more of: subjects, locations, movements or activities in real-time, based on the stored clusters.

5. The system of claim 1 wherein the at least one analytics application resides, in whole or in part, on one or more of a remote computer, a local computer or one or more of the devices.

6. The system of claim 1, wherein the at least one analytics application is configured to format the one or more measurable variables.

7. The system of claim 6, wherein the at least one analytics application is configured to process the formatted measurements.

8. The system of claim 7, wherein the at least one analytics application is further configured to determine one or more output responses based on the processed measurements.

9. The system of claim 8, wherein at least one of the devices is configured to send one or more of: processed measurements or output responses to one or more of another device or the analytics application.

10. The system of claim 1, wherein at least one of the plurality of devices is capable of transferring data to the analytics application using one or more network topology.

11. The system of claim 10, wherein the one or more network topology is defined in the IEEE 802.11 family standards for Wi-Fi communications.

12. The system of claim 1, wherein at least one of the plurality of devices is capable of transferring data to the analytics application using another wireless communication standard.

13. The system of claim 12, wherein the other wireless communication standard is any one of: Zigbee, Bluetooth, 3G, 4G, and LTE.

14. The system of claim 1, wherein at least one device comprises:
   at least one processor;
   at least one wireless interface to interact with one or more of a wireless network or another device;
   a first logic unit capable of extracting measurable variables of the wireless signals which are sensitive to changes in the environment;
   a second logic unit capable of formatting the measurement data and sharing it with a network and/or another device to which the device is connected;
   computer executable instructions to initiate wireless communications in order to interact with at least one other device in order to generate the sensing area.

15. The system of claim 14, wherein the at least one device further comprises one or more of:
   a wireless signal repeater functionality in order to extend the coverage area of the wireless sensing network the device is associated to;
   circuitry to supply, monitor and/or control power to one or more external devices;
   at least one mechanism to send wireless communications to one or more external devices for at least one of: control, notification or other data transmission;
   at least one mechanism to send wired communications to external devices for one or more of control, notification or another data transmission.

16. The system of claim 1, wherein at least one of the plurality of devices comprises a mechanism to remain fixed in three-dimensional space in order to ensure consistency of measured changes in the environment.

17. A method for wireless signal-based sensing comprising:
   having a sensing area generated by a plurality of devices, each device in the sensing area capable of sending and receiving wireless signals according to a communication protocol, wherein the communication protocol comprises at least one existing mechanism at a first layer of the devices for sensing a communication channel between pairs of connected devices in the sensing area;
   establishing the communication channel to generate sensed data at the first layer;
   enabling at least one application of at least one of the plurality of devices to access at least the first layer of the device to obtain measurements sensed by the communication protocol using the existing mechanism, wherein the at least one application is configured to generate traffic on the communication channel when an insufficient amount of network traffic is present;
   receiving and processing measurements of wireless signals by at least one analytics application, the measurements having been obtained from the sensing area by the plurality of devices, wherein the at least one analytics application is configured to process one or more of: temporal changes in wireless signal intensity, channel frequency response, impulse response, or any other measurable variables of the wireless signals that are sensitive to changes in an environment; and
   at least one of the plurality of devices: reading one or more measurable variables, storing one or more measurable variables, and sending one or more measurable variables to at least one of another device and the analytics application.

18. The method of claim 17, wherein the first layer is a layer of the OSI reference model.

19. The method of claim 17, further comprising:
   creating one or more clusters comprising relevant groupings of measurements from the measured data in order to associate those clusters with one or more of: specific subjects, locations, movements or activities; and
   storing the identified clusters and collects and generates labels for the clusters corresponding to one or more of: subjects, locations, movements or specific activities.

20. The method of claim 19, further comprising:
   applying at least one of digital signal processing and machine learning, to recognize one or more of: subjects, locations, movements or activities in real-time, based on the stored clusters.

21. The method of claim 17, wherein the at least one analytics application resides, in whole or in part, on one or more of a remote computer, a local computer or one or more of the devices.

22. The method of claim 17, further comprising formatting the one or more measurable variables.

23. The method of claim 22, further comprising processing the formatted measurements.

24. The method of claim 23, further comprising determining one or more output responses based on the processed measurements.

25. The method of claim 24, wherein at least one of the devices is configured to send one or more of: processed measurements or output responses to one or more of another device or the analytics application.

26. The method of claim 17, wherein at least one of the plurality of devices is capable of transferring data to the analytics application using one or more network topology.

27. The method of claim 26, wherein the one or more network topology is defined in the IEEE 802.11 family standards for Wi-Fi communications.

28. The method of claim 17, wherein at least one of the plurality of devices is capable of transferring data to the analytics application using another wireless communication standard.

29. The method of claim 28, wherein the other wireless communication standard is any one of: Zigbee, Bluetooth, 3G, 4G, and LTE.

30. The method of claim 17, wherein the at least one device comprises:
   at least one processor;
   at least one wireless interface to interact with one or more of a wireless network or another device;
   a first logic unit capable of extracting measurable variables of the wireless signals which are sensitive to changes in the environment;

a second logic unit capable of formatting the measurement data and sharing it with a network and/or another device to which the device is connected;
computer executable instructions to initiate wireless communications in order to interact with at least one other device in order to generate the sensing area.

31. The method of claim 30, wherein the at least one device further comprises one or more of:
a wireless signal repeater functionality in order to extend the coverage area of the wireless sensing network the device is associated to;
circuitry to supply, monitor and/or control power to one or more external devices;
at least one mechanism to send wireless communications to one or more external devices for at least one of: control, notification or other data transmission;
at least one mechanism to send wired communications to external devices for one or more of control, notification or another data transmission.

32. The method of claim 17, wherein at least one of the plurality of devices comprises a mechanism to remain fixed in three-dimensional space in order to ensure consistency of measured changes in the environment.

33. A computer readable medium comprising computer executable instructions for wireless signal-based sensing comprising instructions for:
having a sensing area generated by a plurality of devices, each device in the sensing area capable of sending and receiving wireless signals according to a communication protocol, wherein the communication protocol comprises at least one existing mechanism at a first layer of the devices for sensing a communication channel between pairs of connected devices in the sensing area;
establishing the communication channel to generate sensed data at the first layer;
enabling at least one application of at least one of the plurality of devices to access at least the first layer of the device to obtain measurements sensed by the communication protocol using the existing mechanism, wherein the at least one application is configured to generate traffic on the communication channel when an insufficient amount of network traffic is present;
receiving and processing measurements of wireless signals by at least one analytics application, the measurements having been obtained from the sensing area by the plurality of devices, wherein the at least one analytics application is configured to process one or more of: temporal changes in wireless signal intensity, channel frequency response, impulse response, or any other measurable variables of the wireless signals that are sensitive to changes in an environment; and
at least one of the plurality of devices: reading one or more measurable variables, storing one or more measurable variables, and sending one or more measurable variables to at least one of another device and the analytics application.

34. A wireless signal-based sensing system comprising:
at least one sensing area generated by a plurality of devices, each device in the sensing area capable of sending and receiving wireless signals according to a communication protocol, wherein the communication protocol comprises at least one existing mechanism at a first layer of the devices for sensing a communication channel between pairs of connected devices in the sensing area;
at least one application of at least one of the plurality of devices to access at least the first layer of the device to obtain measurements sensed by the communication protocol using the existing mechanism, wherein the at least one application is configured to generate traffic on the communication channel when an insufficient amount of network traffic is present; and
at least one analytics application for receiving and processing measurements of wireless signals obtained from the sensing area by the plurality of devices;
wherein at least one device comprises:
at least one processor;
at least one wireless interface to interact with one or more of a wireless network or another device;
a first logic unit capable of extracting measurable variables of the wireless signals which are sensitive to changes in the environment;
a second logic unit capable of formatting the measurement data and sharing it with a network and/or another device to which the device is connected;
computer executable instructions to initiate wireless communications in order to interact with at least one other device in order to generate the sensing area.

35. A wireless signal-based sensing system comprising:
at least one sensing area generated by a plurality of devices, each device in the sensing area capable of sending and receiving wireless signals according to a communication protocol, wherein the communication protocol comprises at least one existing mechanism at a first layer of the devices for sensing a communication channel between pairs of connected devices in the sensing area;
at least one application of at least one of the plurality of devices to access at least the first layer of the device to obtain measurements sensed by the communication protocol using the existing mechanism, wherein the at least one application is configured to generate traffic on the communication channel when an insufficient amount of network traffic is present; and
at least one analytics application for receiving and processing measurements of wireless signals obtained from the sensing area by the plurality of devices, wherein the at least one analytics application is configured to:
create one or more clusters comprising relevant groupings of measurements from the measured data in order to associate those clusters with one or more of: specific subjects, locations, movements or activities; and
store the identified clusters and collects and generates labels for the clusters corresponding to one or more of: subjects, locations, movements or specific activities.

* * * * *